Patented May 11, 1948

2,441,337

UNITED STATES PATENT OFFICE 2,441,337

PROCESS OF PREPARING DIBASIC CALCIUM HYPOCHLORITE

Jerome W. Sprauer, Yeadon, Pa., assignor to The Pennsylvania Salt Manufacturing Company, Philadelphia, Pa., a corporation of Pennsylvania No Drawing. Application December 30, 1942, Serial No. 470,650

3 Claims. (Cl. 23—86)

The present invention relates to the preparation of dibasic calcium hypochlorite:

$$Ca(OCl)_2 \cdot 2Ca(OH)_2$$

and more particularly, it relates to a process by which the crystals of dibasic calcium hypochlorite, formed by known methods, are caused to grow in size by mixing calcium hydroxide and a suspension of the crystals and by the subsequent addition of hypochlorite ions, with the result that a crystalline dibasic calcium hypochlorite product is obtained which may be more easily separated from the suspending solution than has heretofore been the case.

The chlorination of calcium hydroxide suspended in water yields crystals of dibasic calcium hypochlorite when the chlorination is conducted under properly controlled conditions, well known in the art. Several variations in the methods of producing dibasic calcium hypochlorite are known, but heretofore the separation of the crystals from the mother liquor has presented technological difficulties. The difficulties are due to the small size of the dibasic calcium hypochlorite, and even when the compound is produced as well formed hexagonal crystals, these are small and difficult to remove from the aqueous medium by conventional means, such as filtration.

One object of the present invention is to overcome the disadvantage of the prior processes and to provide a simple and economical process for the preparation of dibasic calcium hypochlorite crystals that are relatively easily filtered from the mother liquor.

Another object of the invention is to provide a method by which dibasic calcium hypochlorite crystals of the size obtained by prior methods are caused to grow, and by which nucleation, that is, the formation of very small crystals, may be controlled and minimized, thus providing a yield of crystals of improved filtrability.

Other objects, including the provision of a process giving a substantially higher yield of dibasic calcium hypochlorite than has usually been obtained, will be apparent from a consideration of the specification and claims.

The present invention involves the steps in the preparation of dibasic calcium hypochlorite which comprise mixing calcium hydroxide and an aqueous suspension containing appreciable amounts of dibasic calcium hypochlorite crystals, and adding to the resulting suspension further hypochlorite ions in an amount to convert at least a substantial portion of the calcium hydroxide into dibasic calcium hypochlorite. The aqueous suspension of dibasic calcium hypochlorite with which calcium hydroxide is mixed is in approximate equilibrium with calcium hydroxide, and the amount of calcium hydroxide mixed therewith is sufficient to provide in the suspension appreciable amounts of calcium hydroxide and a weight ratio of dibasic calcium hypochlorite before the addition of the hypochlorite ions to that in the suspension after the addition of the hypochlorite ions of not less than about 0.10, preferably not less than about 0.15. Furthermore, the temperature of the suspension of the dibasic calcium hypochlorite and the calcium hydroxide during the conversion of the calcium hydroxide to dibasic calcium hypochlorite by the hypochlorite ions is not less than about 25° C., preferably 30° C., or higher.

A further feature of the invention resides in introducing sodium chloride in the process, if desired, in which case the final suspending solution should be in approximate equilibrium with calcium hydroxide to increase the yield of dibasic calcium hypochlorite. The presence of sodium chloride increases the yield of dibasic calcium hypochlorite because the sodium chloride decreases the calcium hypochlorite content of a solution in equilibrium with dibasic calcium hypochlorite and calcium hydroxide (or tribasic calcium chloride hydrate) at any given temperature, which has not previously been known.

The hypochlorite ions may be furnished to the suspension of dibasic calcium hypochlorite and calcium hydroxide by adding chlorine to the aqueous suspension of dibasic calcium hypochlorite and calcium hydroxide, since the chlorine dissolves therein to form such ions; or by adding to the suspension a solution containing hypochlorite ions in appreciable excess of that concentration which would be in equilibrium with dibasic calcium hypochlorite and calcium hydroxide, that is to say, a solution containing sufficient hypochlorite to form dibasic calcium hypochlorite with at least a substantial portion of the calcium hydroxide present.

As pointed out, the suspension with which the calcium hydroxide is mixed contains appreciable amounts of dibasic calcium hypochlorite in a solution in approximate equilibrium with calcium hydroxide; that is to say, suspensions of dibasic calcium hypochlorite are not employed which contain a substantial amount of hypochlorite ions available for combination with the mixed calcium hydroxide. If this condition is not observed, an undesirable amount of nucleation occurs. The term "substantial amount of hypochlorite ions available for combination with the mixed calcium hydroxide," as used herein, means those amounts which cause sufficient nucleation, so that a suspension of improved filtrability is not obtained. Preferably, there are no hypochlorite ions available for combination with the mixed calcium hydroxide, and in general, the amount present available for such combination, if any, will advantageously not be more than a few per cent., for example, about 5% of the total hypochlorite content of the suspension.

The treatment of the suspension of dibasic calcium hypochlorite, as described, causes the dibasic calcium hypochlorite crystals in the suspension to grow to form crystals of a larger size, which imparts improved filtrability. In the preferred processes, nucleation is reduced to a minimum. In order to increase the crystal size still more, the steps described may be repeated, that is, the suspension obtained as the result of the steps set forth may be further treated by the mixture therewith of calcium hydroxide to form the suspension of the characteristics set forth, with the subsequent addition of hypochlorite ions to the suspension under the temperature conditions described. When the steps are to be repeated, the hypochlorite ions added to the suspension in the preceding step will advantageously not be in appreciable excess over that necessary to convert the calcium hydroxide into dibasic calcium hypochlorite, in order that the suspending solution will be in approximate equilibrium with calcium hydroxide. The steps can be repeated until the point is reached where the total surface area of the crystals is such that undesirable amounts of new crystals of relatively small size are formed upon repetitions of the steps of the process.

At the completion of the process, substantially all of the calcium hydroxide will have been converted by the additional hypochlorite ions into dibasic calcium hypochlorite, and in order to avoid loss of hypochlorite, the amount of hypochlorite ions added to the suspension will advantageously not be in excess of that necessary to convert the calcium hydroxide to dibasic calcium hypochlorite. Upon completion of the process, the dibasic calcium hypochlorite crystals are separated from the aqueous medium by any conventional means, such as filtration. To realize maximum yields for any given conditions of concentration, time must be allowed for a close approach to equilibrium prior to separation of the dibasic calcium hypochlorite from the aqueous medium.

The crystalline dibasic calcium hypochlorite product may be readily washed with hot water, and as is well known, dried at elevated temperatures, such as 100° C., or higher, to produce a product of higher stability than that of any other form of solid calcium hypochlorite. A typical commercial dibasic calcium hypochlorite product, for example, may contain (as shown by conventional analytical methods) 42% $Ca(OCl)_2$, 48% $Ca(OH)_2$, 5% $CaCl_2$, the balance being chlorite, chlorate, water and the common impurities of lime. Furthermore, the wet crystals of dibasic calcium hypochlorite, washed or unwashed, may be used in further processing, such as by suspension in water and chlorination to produce higher test hypochlorites according to known methods.

The suspension to which the hypochlorite ions are added may be produced by adding chlorine to an aqueous suspension of calcium hydroxide to form a suspension of dibasic calcium hypochlorite in approximate equilibrium with calcium hydroxide and in which there is substantial conversion of the calcium hydroxide into dibasic calcium hypochlorite, and then mixing this suspension and calcium hydroxide. It may also be produced by combining an aqueous solution containing hypochlorite ions with calcium hydroxide, the concentration of the hypochlorite ions in the solution and the amount of calcium hydroxide being sufficient to form the suspension in which the calcium hydroxide has been substantially converted into dibasic calcium hypochlorite in a solution in approximate equilibrium with calcium hydroxide, and then mixing this suspension and calcium hydroxide. Following the preparation of either of these suspensions, the additional hypochlorite ions may be furnished by either of the sources of such ions above described.

The calcium hydroxide mixed with the aqueous suspension of dibasic calcium hypochlorite may be suspended in an aqueous medium, or dry calcium hydroxide may be mixed with the suspension. The term "dry calcium hydroxide" and "dry hydrated lime" as employed herein designates the powdered material as distinguished from the material in aqueous suspension, and the amount of water absorbed by the powdered material is immaterial. In the latter case, it is desirable to add first a small amount of water to the suspension in order to insure that the solution contains no more hypochlorite than would be in equilibrium with the dibasic calcium hypochlorite and calcium hydroxide. The aqueous medium in which the calcium hydroxide may be suspended may be water per se, or may be a solution of hypochlorite. The suspension of calcium hydroxide in a solution of hypochlorite may be formed, for example, by adding chlorine to a suspension of calcium hydroxide in water, or by mixing a solution containing hypochlorite ions with calcium hydroxide. In the case the medium is a solution of hypochlorite, the hypochlorite concentration should be insufficient to cause nucleation of dibasic calcium hypochlorite, that is, it should contain no more hypochlorite than would be in equilibrium with the dibasic calcium hypochlorite and calcium hydroxide. The use of a suspension of calcium hydroxide in a solution of hypochlorite under some conditions of operation enables growth to a larger crystal size for each sequence of operations consisting of mixing calcium hydroxide and adding hypochlorite ions, since more calcium hydroxide can be mixed with the dibasic calcium hypochlorite suspension without excessive dissolution of the dibasic calcium hypochlorite than if water is the suspending medium. While the process may be operated by mixing the calcium hydroxide and the suspension containing the dibasic calcium hypochlorite in any desired manner, it is preferred to add the calcium hydroxide, when it is added as an aqueous suspension, to the suspension containing dibasic calcium hypochlorite, since this avoids undue dissolution of any first small increment of dibasic calcium hypochlorite. On the other hand, if the dibasic calcium hypochlorite suspension contains undesirable amounts of hypochlorite ions over that concentration which would be in equilibrium with calcium hydroxide, the reverse order of addition, dibasic calcium hypochlorite suspension to calcium hydroxide suspension, will minimize nucleation.

The temperature of the medium in which the crystal growth is occurring should be sufficiently high to avoid the crystallization of basic phases other than dibasic calcium hypochlorite, and, therefore, a temperature not less than about 25° C. is employed. In the case of solutions relatively low or moderate in calcium chlorite content, the temperature will preferably be in the neighborhood of about 30° C., or higher, whereas in higher concentrations of calcium chloride, the temperature is preferably about 40° C., or higher. The upper limit of temperature is immaterial, so long as the extent of decomposition is not excessive. In the treatment of the suspensions with chlorine, no external heating is required, since the heat of reaction raises the temperature to the desired degree; and in fact, cooling is usually necessary to avoid a temperature rise to a point where decomposition is objectionable. In general, temperatures in the neighborhood of 40° C., or higher, yield the best formed crystals with minimum nucleation.

The calcium hydroxide mixed with the aqueous suspension of dibasic calcium hypochlorite is sufficient, as stated, to provide a weight ratio of dibasic calcium hypochlorite in the suspension before the addition of the hypochlorite ions to that in the suspension after the addition of hypochlorite ions of not less than about 0.10, preferably not less than about 0.15. For any given conditions of crystallization, a certain minimum surface area of dibasic calcium hypochlorite in the suspension to which hypochlorite ions are added is required to minimize nucleation. The minimum required amount of preformed dibasic calcium hypochlorite might be expressed in terms of crystal area, but in practice it is simpler to ascertain the preferred amount of dibasic calcium hypochlorite crystals by empirical methods. Hence, although the increase in the amount of dibasic calcium hypochlorite, through the addition of hypochlorite ions without intervening addition of calcium hydroxide, by a factor of about 100 to 10 is the limit for improved filtrability, in specific instances, as will appear in the examples hereinafter set forth, higher ratios, depending upon the manner of operation, of initial to final dibasic calcium hypochlorite crystals are preferable.

In those methods of operation in which there is a repetition of the steps of the process, the crystal area per unit of weight after several repetitions, depending upon the manner of operation, decreases to such an exent that excessive nucleation occurs. A higher ratio of initial to final dibasic calcium hypochlorite enables growing the crystals larger with minimum nucleation through more repetitions of the steps of the process. The number of times a suspension of dibasic calcium hypochlorite produced by given procedure can be subjected to repetitions of the steps of the process under given conditions of concentrations and ratios of initial to final dibasic calcium hypochlorite having once been ascertained by experiment, the process can thereafter be conducted by using a fewer number of repetitions of the steps than leads to excessive nucleation.

Obviously, two or more aqueous suspensions of apreciable amounts of dibasic calcium hypochlorite in solutions in approximate equilibrium with calcium hydroxide, whose crystal size distributions are different, may be combined to yield a crystalline suspension of any desired size distribution for treatment in accordance with the invention. For example, a given suspension of dibasic calcium hypochlorite prepared by known methods may be combined with the suspension of dibasic calcium hypochlorite produced by carrying out the steps, or repetitions of the steps, of the process.

Obviously, concentrations of solutions and suspensions will be chosen which give economical yields of dibasic calcium hypochlorite. In any particular case, the weight ratio of dibasic calcium hypochlorite to suspending solution may be adjusted by discarding a portion of the suspending solution, such as by filtration or decantation. On the other hand, concentrations of solutions and suspensions cannot be chosen which produce concentrated suspensions of such a consistency that they cannot be readily agitated and handled.

Moreover, calcium chloride in relatively high concentrations tends to have a harmful effect upon the crystal development of the dibasic calcium hypochlorite, while, on the other hand, such concentrations of calcium chloride improve the yields of dibasic calcium hypochlorite. In the preferred embodiments of the invention, a balance between these two factors is selected, as illustrated in the specific examples.

In general, the rate of addition of the hypochlorite ions to the suspension of dibasic calcium hypochlorite and calcium hydroxide will advantageously be moderate, such as illustrated by the specific examples. If the rate of addition of hypochlorite ion is either excessively high or excessively low, there is a tendency for undesirable nucleation. In any particular case, the most favorable rate of addition of hypochlorite ion can be determined experimentally.

When the final suspending solution is to be in approximate equilibrium with calcium hydroxide, it is desirable to introduce sodium chloride in the process, since the presence of this salt in the suspension prior to the separation of the dibasic calcium hypochlorite from the aqueous medium improves the yield of the process. The sodium chloride may be added at any time. If the sodium chloride is added early in the process, the successive steps of the invention must be conducted with cognizance of the fact that sodium chloride affects the equilibria which determine the manner of operation. However, since sodium chloride has an undesirable influence on the crystal development, particularly in the presence of rather high calcium chloride concentration, it is advantageously added to the suspension after the principal crystal growth has been effected. As stated above, an increased yield is not obtained unless there is sufficient calcium hydroxide in the suspension to form dibasic calcium hypochlorite with the calcium hypochlorite forced from the solution by the presence of the sodium chloride. Hence, the process may be so conducted that the necessary calcium hydroxide remains after the addition of hypochlorite ions and prior to the addition of sodium chloride, or the necessary calcium hydroxide may be added to the suspension prior to the addition of the sodium chloride. The amount of sodium chloride present may be any amount up to the saturation value of sodium chloride in the particular solution under consideration; and, in general, the more sodium chloride present up to the saturation value, the higher will be the yield of dibasic calcium hypochlorite obtained. As hereinabove stated, the increased yield of dibasic calcium hypochlorite is attributable to the fact, which has not previously been known, that the presence of sodium chloride decreases the calcium hypochlorite content of a solution in equilibrium with dibasic calcium hypochlorite and calcium hydroxide (or tribasic calcium chloride hydrate) at any given temperature.

Referring further to the preparation of a suspension of dibasic calcium hypochlorite, to which calcium hydroxide is added, by the chlorination of an aqueous suspension of calcium hydroxide, the prior art methods are followed. It has been found, for example, that in the chlorination of an aqueous suspension of calcium hydroxide, the best initial crystal development is obtained by chlorination of an aqueous suspension containing from about 15% to 29% Ca(OH)$_2$ at a moderate rate at 40° C. or higher.

Such chlorinated suspensions are particularly useful in the practice of the invention wherein dry hydrated lime, with or without the intervening addition of a small amount of water, is mixed therewith, and such practice gives crystals of good filtrability, even in a single application of the steps in the process.

In the practice of the invention in which an aqueous suspension of calcium hydroxide is mixed with the dibasic calcium hypochlorite suspension, the latter is preferably produced by chlorination of a suspension of calcium hydroxide of a higher concentration such as a suspension containing about 24% to 44% Ca(OH)$_2$, at a moderate rate at 40° C. or higher. The use of such suspensions is also particularly advantageous when there are to be a number of repetitions of the steps of the process.

As a balance between the factors of yield and consistency of suspension, it has been found particularly useful to have the final suspension prior to the separation of dibasic calcium hypochlorite, equivalent to about a 37% Ca(OH)$_2$ suspension, that is, a suspension in which the ratio of calcium (Ca) content to total water (H$_2$O) content is about 20 to 80. This balance between these factors is not at all critical, and equivalent concentrations of about 32% to 44% Ca(OH)$_2$ give reasonable yields. If sodium chloride is used to improve yields, equivalent concentrations in the final suspension of as low as 16% Ca(OH)$_2$ may be found to be economical. On the other hand, if high calcium chloride concentrations and thick consistency of the final suspension are not objectionable, that is if higher temperatures, such as not less than 40° C., are employed and agitation difficulties are overcome, use of an equivalent concentration as high as about 50% Ca(OH)$_2$ is possible, which has heretofore been impractical in the prior art processes.

The term "moderate rate," when applied to the chlorination of a suspension of calcium hydroxide and dibasic calcium hypochlorite, or the former alone, from which there has been no separation of calcium chloride, that is, when calcium hypochlorite and calcium chloride are present in the suspension in about equimolecular proportions, includes rates from about 0.5 to 2.5% of the theoretical chlorine equivalent per minute. [The theoretical chlorine equivalent of such suspensions is defined as 71/40 of the calcium (Ca) content of the suspension; thus, a chlorination rate of one per cent. of the theoretical chlorine equivalent per minute is $x$ parts by weight of chlorine per minute where $x$ is 1/100 times 71/40 times the parts by weight of calcium (Ca).]

In these chlorination processes, in which the weight ratio of dibasic calcium hypochlorite to suspending solution is rather high as compared to the processes in which hypochlorite ions are furnished by addition of a solution, a ratio of initial to final dibasic calcium hypochlorite in the process of the invention is preferably 0.15 or higher, particularly advantageous results being obtained when the weight ratio is between about 0.25 and 0.75. Still higher weight ratios may be employed, and the upper limit is dependent merely upon economic considerations.

The manner of operation in which the source of hypochlorite ions is a solution is particularly applicable to the recovery of hypochlorite values from waste solutions from other processes, either in the formation of the initial suspension of dibasic calcium hypochlorite or in providing additional hypochlorite ions to the suspension of dibasic calcium hypochlorite and calcium hydroxide. Concentrations, in these cases, therefore, are primarily dictated by the other processes, although the present invention is applicable to any range of sodium chloride and calcium chloride concentrations. The amount of calcium hydroxide mixed with the hypochlorite solution is, of course, determined by the amount of recoverable hypochlorite content of the solution, which in turn is a function of the sodium chloride and calcium chloride content. It is known to the prior art that adding a hypochlorite solution to an aqueous suspension of calcium hydroxide yields better crystal development than the reverse order of addition or the use of dry hydrated lime. It is also known that temperatures in the neighborhood of 40° C. and higher are preferable. It has also been found that analogous to chlorination processes, a moderate rate of addition of hypochlorite ions yields the best results. In this case, "moderate rate of addition of hypochlorite ions" is defined as 0.1 to 6 parts by weight of solution per minute per parts by weight of Ca(OH)$_2$ in the suspension at the start of the addition of hypochlorite ions.

As has been previously pointed out, the presence of sodium chloride has a harmful effect on crystal development, particularly in the presence of rather high calcium chloride concentration. Hence, in the recovery of hypochlorite values from waste solutions containing sodium chloride, there is some advantage in preparing the initial dibasic calcium hypochlorite suspension by the chlorination of a water suspension of calcium hydroxide.

In the process where the hypochlorite ions are furnished by the addition of a solution, advantageous results are obtained when a ratio of initial to final dibasic calcium hypochlorite in the process of the invention is between about 0.10 to 0.25.

It will be fully appreciated that for economical reasons in commercial practice an ordinary purity high calcium slaked lime is used whenever calcium hydroxide is indicated. For all practical purposes, the total alkalinity of a sample as determined by titration with standard acid to a phenolphthalein endpoint may be calculated to the equivalent calcium hydroxide and it is this that is meant by the terms "% Ca(OH)$_2$" and "parts by weight Ca(OH)$_2$" in this specification. Whenever calculations are given in the following examples, they are based upon this "% Ca(OH)$_2$", and ignore the small proportion of common lime impurities, a water suspension of hydrated lime of 37% Ca(OH)$_2$, for example, being treated as a suspension of 37 parts by weight of calcium hydroxide in 63 parts by weight of water.

The following examples are illustrative of the process of the invention:

*Example I*

To 100 parts by weight of a water suspension of hydrated lime containing about 37% Ca(OH)$_2$ were added 19 parts by weight of chlorine in about 35 minutes, the temperature being allowed to rise and then maintained at about 40–50° C. To every 119 parts by weight of this suspension were added another 100 parts by weight of the 37% Ca(OH)$_2$ suspension, followed by addition of 19 parts by weight of chlorine in about 20 minutes, the temperature being initially about 30° C., and rising during chlorination to 40-50° C., where it was maintained by cooling, and these steps were repeated five more times, with use each time of the suspension of the preceding chlorination, before separation of the dibasic calcium hypochlorite from its suspending solution.

The first mentioned chlorination results in a suspension of about 33 parts by weight

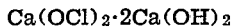

in 86 parts by weight of solution of composition about 4 Ca(OCl)$_2$/22 CaCl$_2$/100 H$_2$O for every 100 parts by weight of initial 37% Ca(OH)$_2$, if time is permitted for approach to equilibrium at 40° C., and each repetition of the steps of the invention yields an essentially identical suspension insofar as composition is concerned, though of increasingly improved filtrability. Mixing of 119 parts by weight of the chlorinated suspension with 100 parts by weight of the 37% Ca(OH)$_2$ suspension results, if time is permitted for approach to equilibrium at 40° C., in a suspension of 23 parts by weight

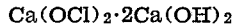

and 42.5 parts by weight Ca(OH)$_2$ in 153.5 parts by weight of solution of composition about 6Ca(OCl)$_2$/11.5 CaCl$_2$/100 H$_2$O. Hence, the ratio of initial to final dibasic calcium hypochlorite after each chlorination step is 0.50 to 0.35 depending upon the time lag between the mixing with calcium hydroxide and the addition of chlorine. The maximum yield of the process is about 85% recovery of the chlorine oxidizing power as dibasic calcium hypochlorite.

*Example II*

The operations of Example I, i. e., the initial chlorination and the six repetitions of the steps of the invention, were carried out with use of only 18 parts by weight of chlorine for each 100 parts by weight of 37% Ca(OH)$_2$ suspension. Prior to separation of the dibasic calcium hypochlorite from its suspending solution, 12 parts by weight of sodium chloride were added for each 118 parts by weight of suspension.

If this suspension to which sodium chloride has been added is permitted to approach equilibrium at 40° C., it consists of about 35 parts by weight Ca(OCl)$_2$·2Ca(OH)$_2$ suspended in 95 parts by weight of solution of composition about 1.4 Ca(OCl)$_2$/21 CaCl$_2$/18NaCl/100 H$_2$O. Hence, the maximum yield of the process is about 95%.

*Example III*

To 100 parts by weight of a water suspension of hydrated lime containing about 26.5% Ca(OH)$_2$ were added 13 parts by weight of chlorine in about 25 minutes, the temperature being allowed to rise to 40° C. and maintained thereafter at 40°-50° C. The resulting suspension was mixed with more lime in the proportion of 100 parts by weight of the 26.5% Ca(OH)$_2$ for every 113 parts by weight of the chlorinated suspension, and then chlorinated with 13 parts by weight of chlorine in about 15 minutes, the temperature being maintained after the initial rise at 40° to 50° C. Then 17 parts by weight of sodium-chloride were added for every 113 parts by weight of chlorinated suspension.

In this procedure, the ratio of initial to final dibasic calcium hypochlorite in the process of the invention is 0.50 to about 0.15, depending upon the time permitted for approach to equilibrium after the mixing of the chlorinated suspension and the suspension of lime hydrate, and the maximum yield is about 90% as calculated from equilibria data.

*Example IV*

To 85 parts by weight of a water suspension of hydrated lime containing about 37% Ca(OH)$_2$ were added 4.5 parts by weight of chlorine. This was mixed with 18 parts by weight of a suspension prepared by treating 100 parts by weight of a 37% Ca(OH)$_2$ suspension with 19 parts by weight of chlorine, as in Example I. To the 107.5 parts by weight of the resulting suspension were added 11.5 parts by weight of chlorine in about 20 minutes, the temperature being maintained at 40° to 50° C. after the initial rise.

The maximum yield of this procedure is, of course, the same as that of Example I. The preliminary chlorination is insufficient to effect dibasic calcium hypochlorite nucleation but prevents appreciable dissolution of the preformed crystals when the two chlorinated suspensions are mixed. The ratio of initial to final dibasic calcium hypochlorite in the process of the invention is about 0.15, as calculated from equilibria data.

*Example V*

To 100 parts by weight of a water suspension of hydrated lime containing about 17% Ca(OH)$_2$ were added about 10.5 parts by weight of chlorine in about 30 minutes, the temperature being allowed to rise and then maintained at 40°-45° C. To every 110.5 parts by weight of this suspension was added dry hydrated lime containing 31.5 parts by weight Ca(OH)$_2$ followed by addition of 14.5 parts by weight of chlorine in about 20 minutes, the temperature being maintained at 40° to 50° C. after the initial rise.

The maximum yield of this procedure is, of course, the same as that of Example I. The ratio of initial to final dibasic calcium hypochlorite in the process of the invention is about 0.23, as calculated from equilibria data.

*Example VI*

To 100 parts by weight of a water suspension of hydrated lime containing about 24% Ca(OH)$_2$ were added about 13 parts by weight of chlorine in about 30 minutes, the temperature being allowed to rise and then maintained at 40-45° C. followed by addition of 30 parts by weight water, followed by addition of dry hydrated lime containing 38 parts by weight Ca(OH)$_2$. To every 181 parts by weight of the resultant suspension were then added 19 parts by weight of chlorine in about 15 minutes, the temperature being maintained at 40° to 50° C. after the initial rise.

The maximum yield of this procedure is, of course, the same as that of Example I. The ratio of initial to final dibasic calcium hypochlorite in the process of the invention is about 0.32 to about 0.22, depending upon the time permitted for approach to equilibrium prior to the second chlorination, as calculated from equilibria data.

*Example VII*

To 119 parts by weight of the product of Example VI was added dry hydrated lime containing about 26 parts by weight Ca(OH)$_2$ followed by addition of about 12 parts by weight of chlorine in about 20 minutes, the temperature being maintained at 40° to 50° C. after the initial rise. The maximum yield of this procedure is about 95%, though the product suspension is of a rather thick consistency and the calcium chloride content of the solution is unusually high. The ratio of initial to final dibasic calcium hypochlorite is about 0.55, as calculated from equilibria data.

*Example VIII*

To 25 parts by weight of a water suspension of hydrated lime containing about 37% Ca(OH)$_2$ were added during a period of about 30 minutes 143 parts by weight of a solution containing about 12 Ca(OCl)$_2$/31 CaCl$_2$/100 H$_2$O, the temperature being maintained at about 40° C. To this suspension were added 75 parts by weight of the 37% Ca(OH)$_2$ suspension, followed by addition during a period of about 30 minutes of 429 parts by weight of the solution containing 12 Ca(OCl)$_2$/31 CaCl$_2$/100 H$_2$O, the temperature being maintained at about 30°–40° C.

At a maximum, if time is permitted for approach to equilibrium at about 40° C., the recovery by this procedure is about 70%, that is about 70% of the total hypochlorite of the suspension is present in the solid phase. The ratio of initial to final dibasic calcium hypochlorite in the process of the invention is 0.25 to about 0.14, depending upon the time permitted for approach to equilibrium prior to the addition of the hypochlorite solution to the suspension of dibasic calcium hypochlorite and calcium hydroxide, as calculated from equilibria data.

*Example IX*

To 100 parts by weight of a water suspension of hydrated lime containing about 17% Ca(OH)$_2$ were added about 10.5 parts by weight of chlorine in about 30 minutes, the temperature being allowed to rise and then maintained at 40°–45° C. To every 110.5 parts by weight of this suspension were added 60 parts by weight of a water suspension of hydrated lime containing about 37% Ca(OH)$_2$. Immediately thereafter 430 parts per weight of solution containing

11 Ca(OCl)$_2$/19NaCl/11.5 CaCl$_2$/100 H$_2$O were added over a period of 30 minutes, the temperature being maintained at about 30° C.

The ratio of initial to final dibasic calcium hypochlorite in the process of the invention is roughly 0.20 to 0.10, while the yield is in the neighborhood of 60%.

Considerable modification is possible in the various examples of the process without departing from the essential features of the invention.

I claim:

1. The steps in the process of preparing dibasic calcium hypochlorite crystals of improved filtrability which comprises mixing calcium hydroxide with an aqueous suspension containing dibasic calcium hypochlorite crystals, the suspending solution of which contains substantially no hypochlorite ions for reaction with the calcium hydroxide, to form a suspension containing appreciable amounts of dibasic calcium hypochlorite crystals and of calcium hydroxide; supplying to said suspension of dibasic calcium hypochlorite crystals and calcium hydroxide, hypochlorite ions capable of reacting with calcium hydroxide to form dibasic calcium hypochlorite in an amount to convert substantially the calcium hydroxide into dibasic calcium hypochlorite, a substantial proportion of which crystallizes from the solution to enlarge the crystals of dibasic calcium hypochlorite present in the original suspension, the amount of hypochlorite ions added not being in appreciable excess over that stoichiometrically required to convert the calcium hydroxide into dibasic calcium hypochlorite, the temperature during said conversion being not less than 25° C., and the amounts of calcium hydroxide mixed with, and of said hypochlorite ions supplied to the suspension of dibasic calcium hypochlorite crystals providing a weight ratio of dibasic calcium hypochlorite in the final suspension of less than 100 to 10 as compared to the amount of said crystals in the suspension before said hypochlorite ions are supplied thereto; and prior to the separation of the dibasic calcium hypochlorite crystals from the suspending solution, adding to the suspension sodium chloride in amounts up to its saturation value to force additional amounts of hypochlorite from the solution, there being present sufficient calcium hydroxide in the suspension prior to the addition of the sodium chloride to insure that the additional hypochlorite forced from the solution is in the form of dibasic calcium hypochlorite.

2. The process of claim 1 wherein the hypochlorite ions supplied to the suspension of dibasic calcium hypochlorite crystals and calcium hydroxide are furnished by passing chlorine into the suspension; wherein the temperature during the conversion of calcium hydroxide into dibasic calcium hypochlorite is not less than about 30° C.; and wherein the amounts of calcium hydroxide mixed with and hypochlorite ions furnished by said chlorine to said suspension provide a weight ratio of dibasic calcium hypochlorite in the final suspension of less than about 100 to 15 and greater than about 100 to 75 as compared with the amount of said crystals in the suspension before said hypochlorite ions are supplied thereto.

3. The process of claim 1 wherein the hypochlorite ions supplied to the suspension of dibasic calcium hypochlorite crystals and calcium hydroxide are supplied in the form of a solution containing hypochlorite ions; wherein the temperature during the conversion of calcium hydroxide into dibasic calcium hypochlorite is not less than about 30° C.; and wherein the amounts of calcium hydroxide mixed with and hypochlorite ions supplied to said suspension, provide a weight ratio of dibasic calcium hypochlorite crystals in the final suspension of less than about 100 to 15 as compared to the amount of said crystals in the suspension before the hypochlorite ions are supplied thereto.

JEROME W. SPRAUER.

REFERENCES CITED

The following references are of record in the file of this patent:

UNITED STATES PATENTS

| Number | Name | Date |
|---|---|---|
| 1,713,669 | MacMullin | May 21, 1929 |
| 1,718,284 | George et al. | June 25, 1929 |
| 1,754,473 | MacMullin et al. | Apr. 15, 1930 |
| 1,787,048 | MacMullin et al. | Dec. 30, 1930 |
| 1,937,230 | Kitchen | Nov. 28, 1933 |
| 2,320,635 | Mericola et al. | June 1, 1943 |

FOREIGN PATENTS

| Number | Country | Date |
|---|---|---|
| 188,662 | Great Britain | May 10, 1943 |